Feb. 23, 1960     M. T. COFFMAN     2,925,899
APPARATUS FOR LOADING COAL
Filed Sept. 17, 1957     10 Sheets-Sheet 1
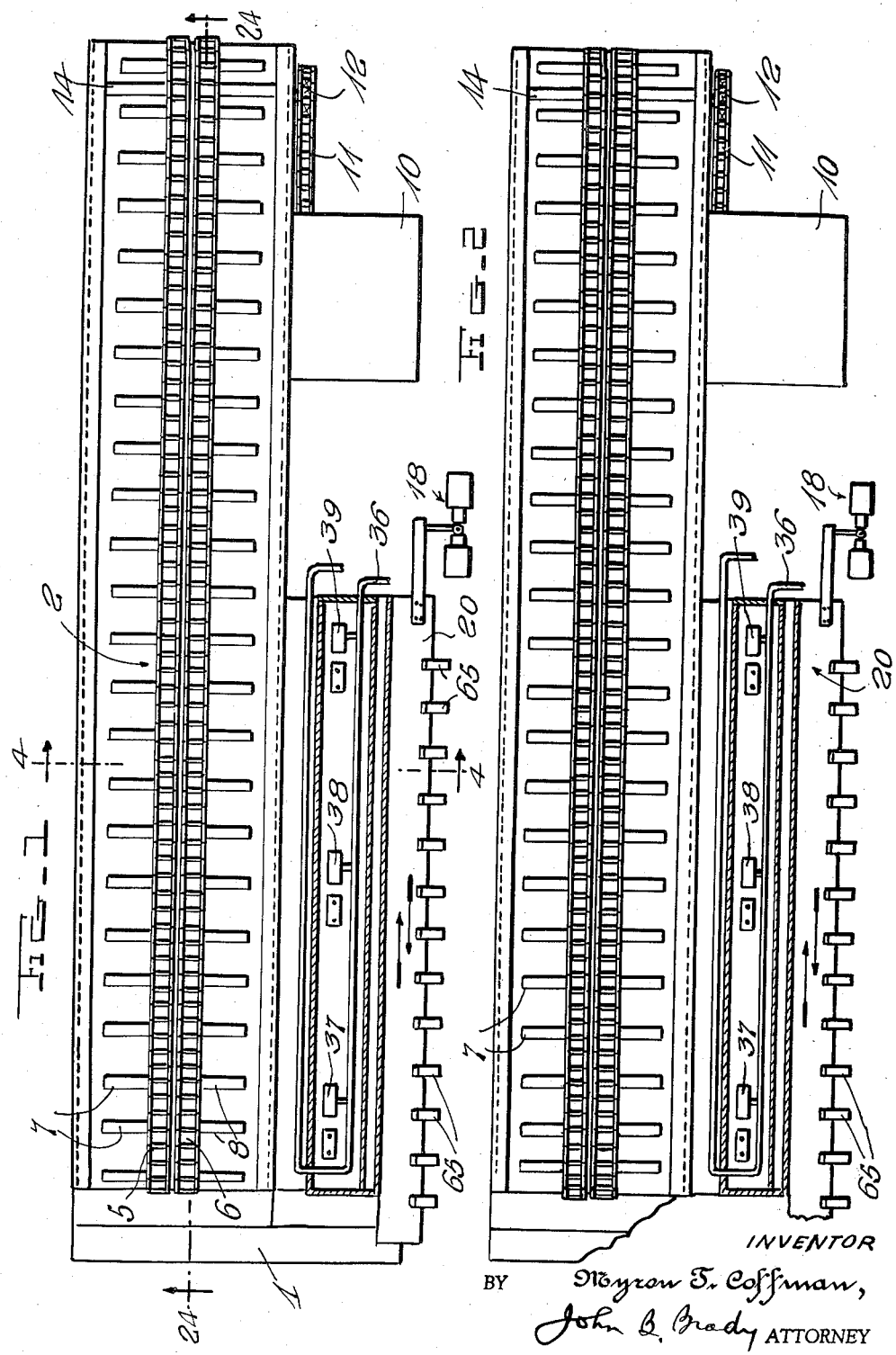
INVENTOR
Myron T. Coffman,
BY John B. Brady ATTORNEY Feb. 23, 1960  M. T. COFFMAN  2,925,899
APPARATUS FOR LOADING COAL
Filed Sept. 17, 1957  10 Sheets-Sheet 2
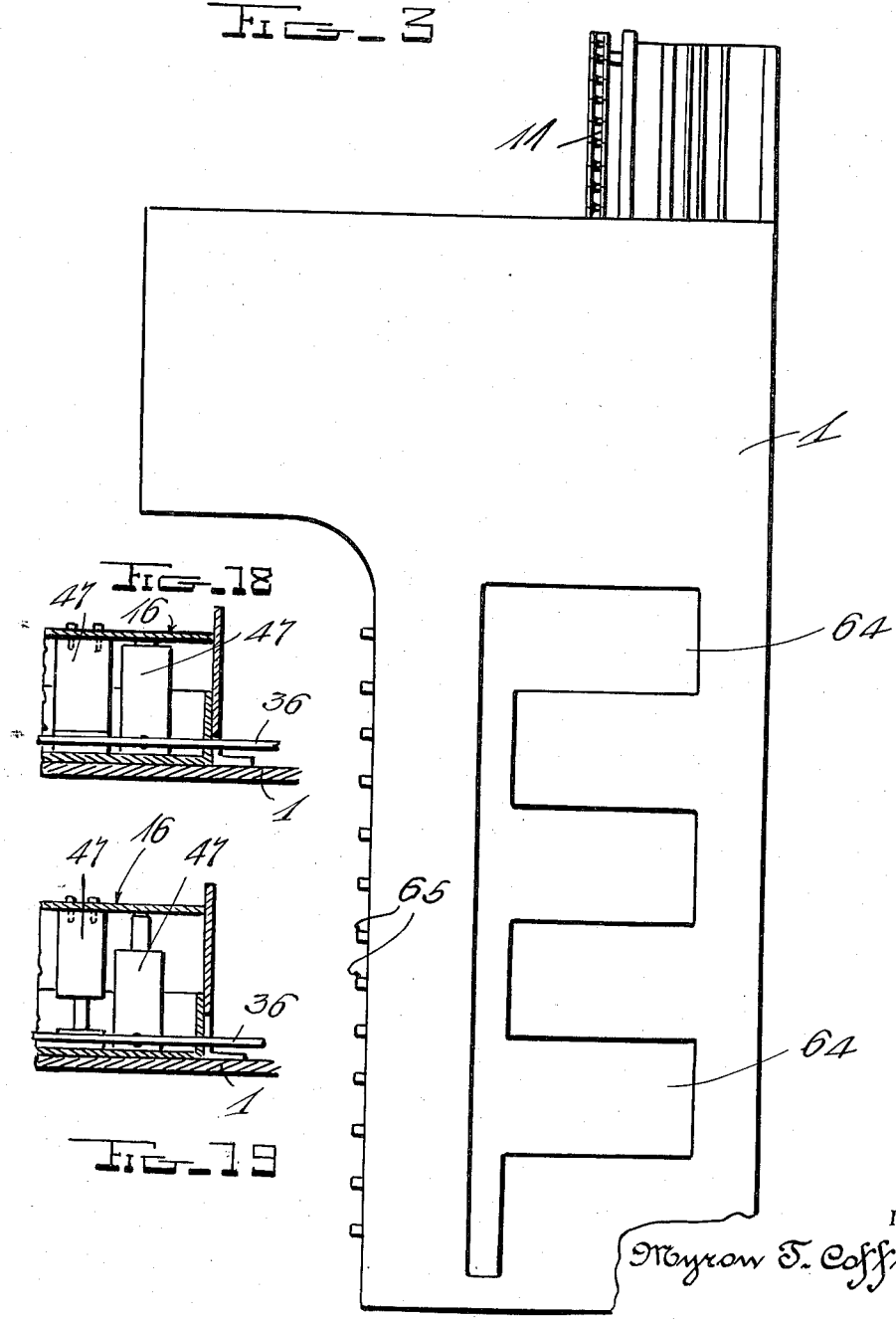
INVENTOR
Myron T. Coffman,
BY
John B. Brady
ATTORNEY Feb. 23, 1960      M. T. COFFMAN      2,925,899
APPARATUS FOR LOADING COAL
Filed Sept. 17, 1957      10 Sheets-Sheet 3

INVENTOR
Myron T. Coffman,
BY John B. Brady
ATTORNEY

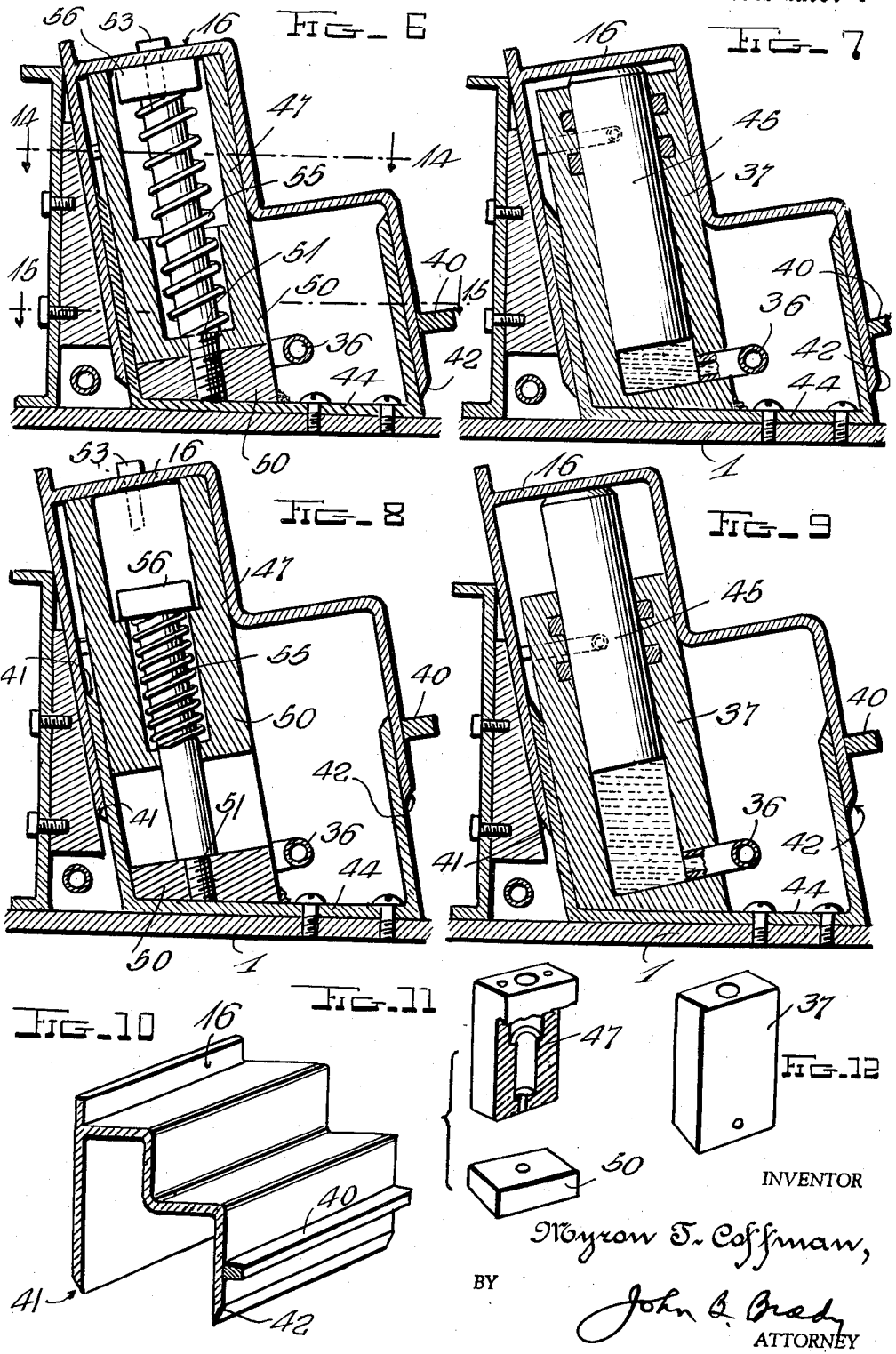

Feb. 23, 1960    M. T. COFFMAN    2,925,899
APPARATUS FOR LOADING COAL
Filed Sept. 17, 1957    10 Sheets-Sheet 5

INVENTOR
Myron T. Coffman,
BY
John B. Brady
ATTORNEY

Feb. 23, 1960
M. T. COFFMAN
2,925,899
APPARATUS FOR LOADING COAL
Filed Sept. 17, 1957
10 Sheets-Sheet 6
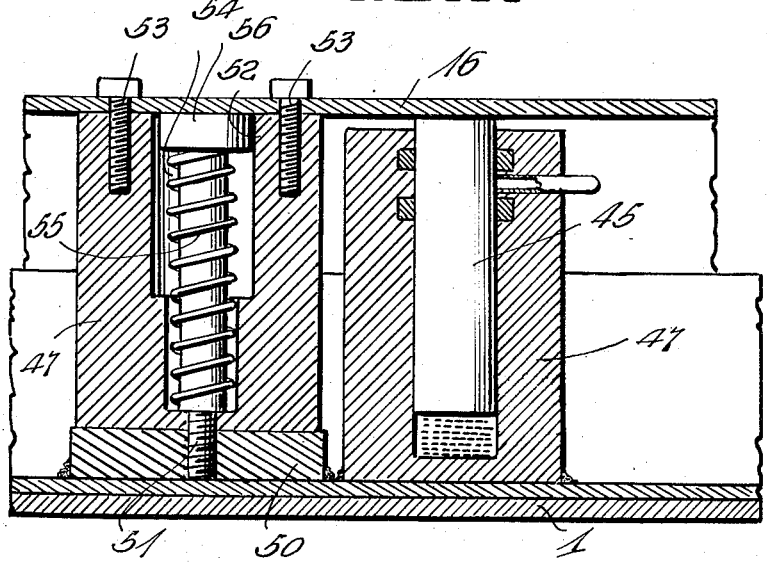
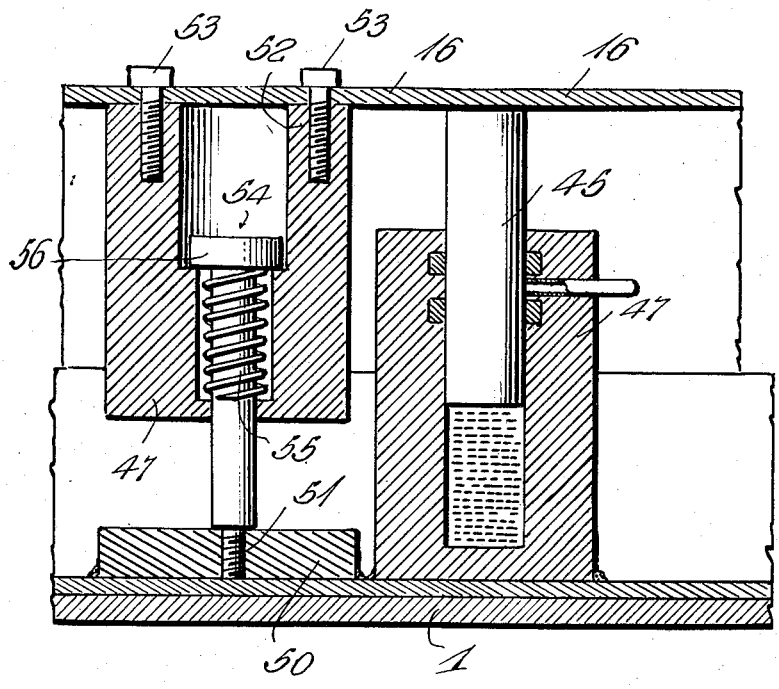
INVENTOR
Myron T. Coffman,
BY
John B. Brady
ATTORNEY

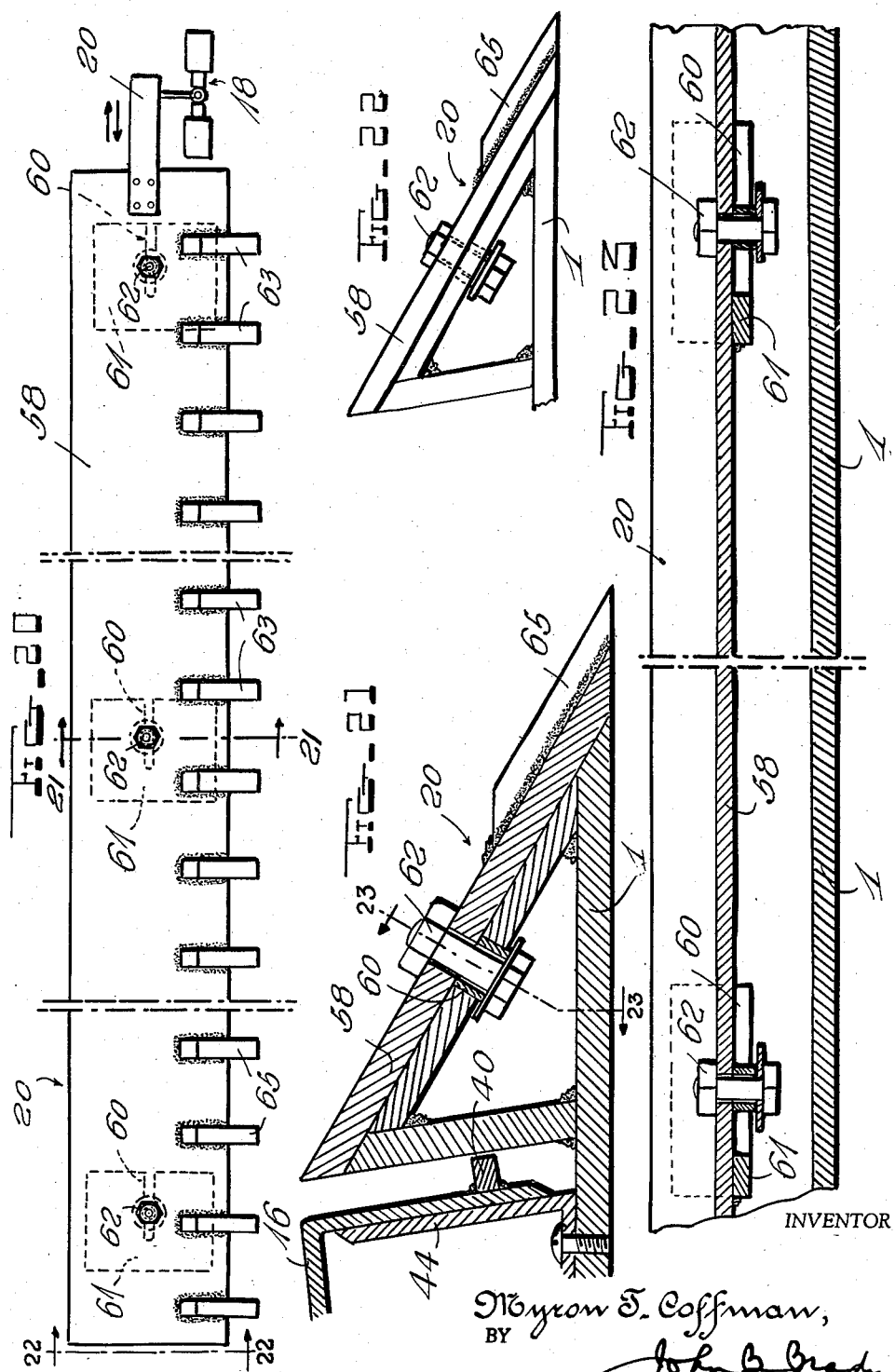

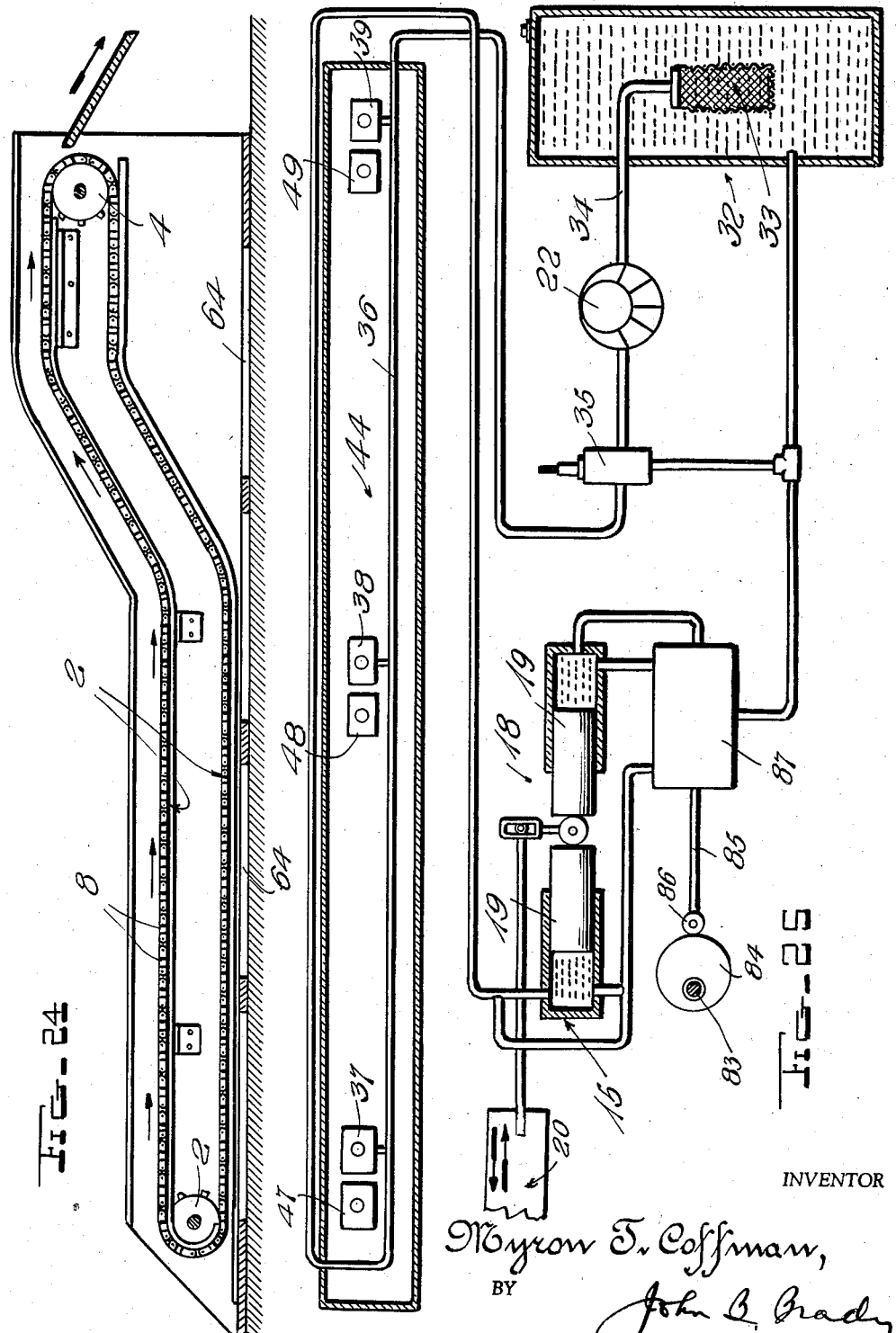

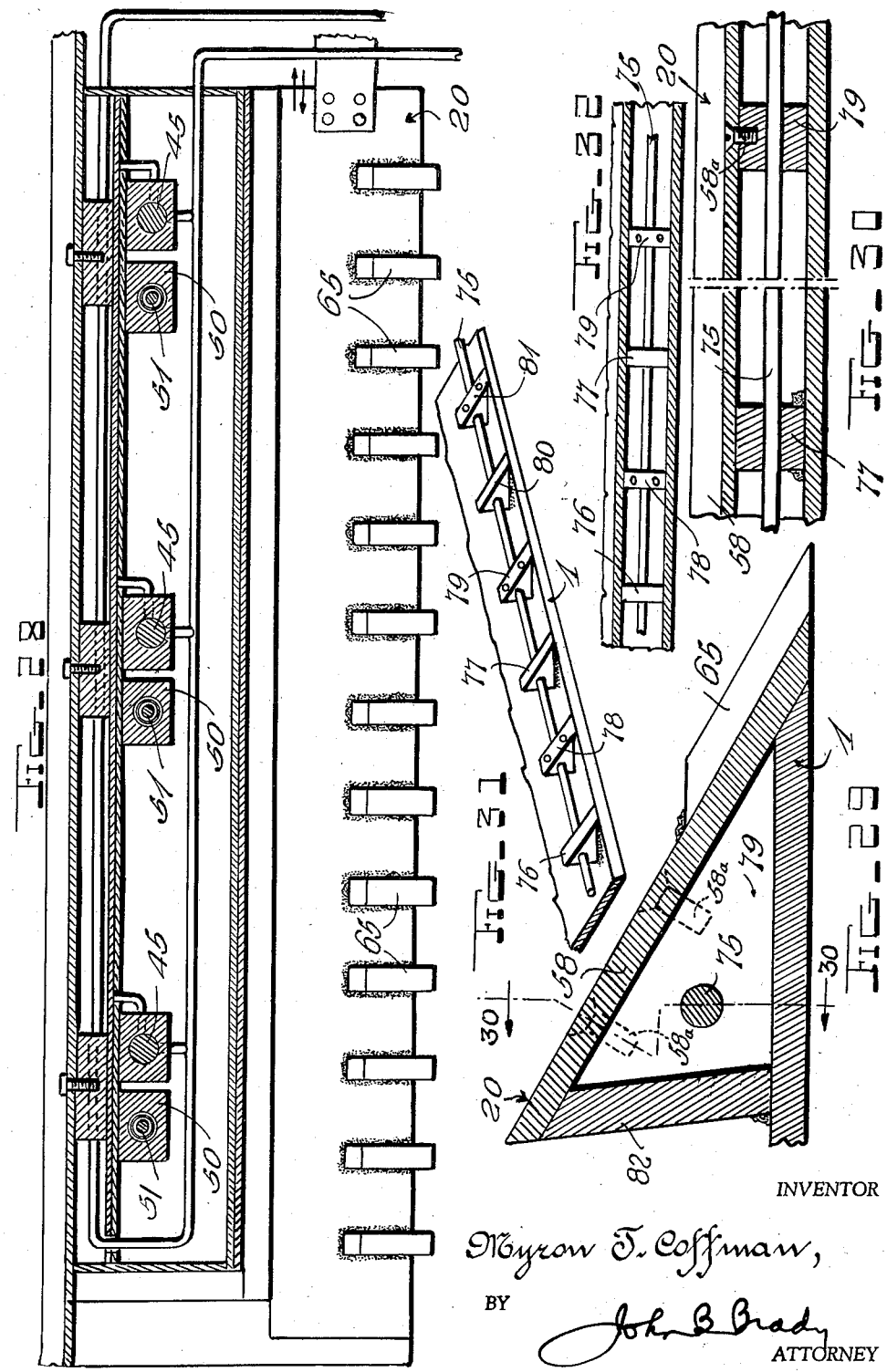

Feb. 23, 1960     M. T. COFFMAN     2,925,899
APPARATUS FOR LOADING COAL
Filed Sept. 17, 1957     10 Sheets-Sheet 10
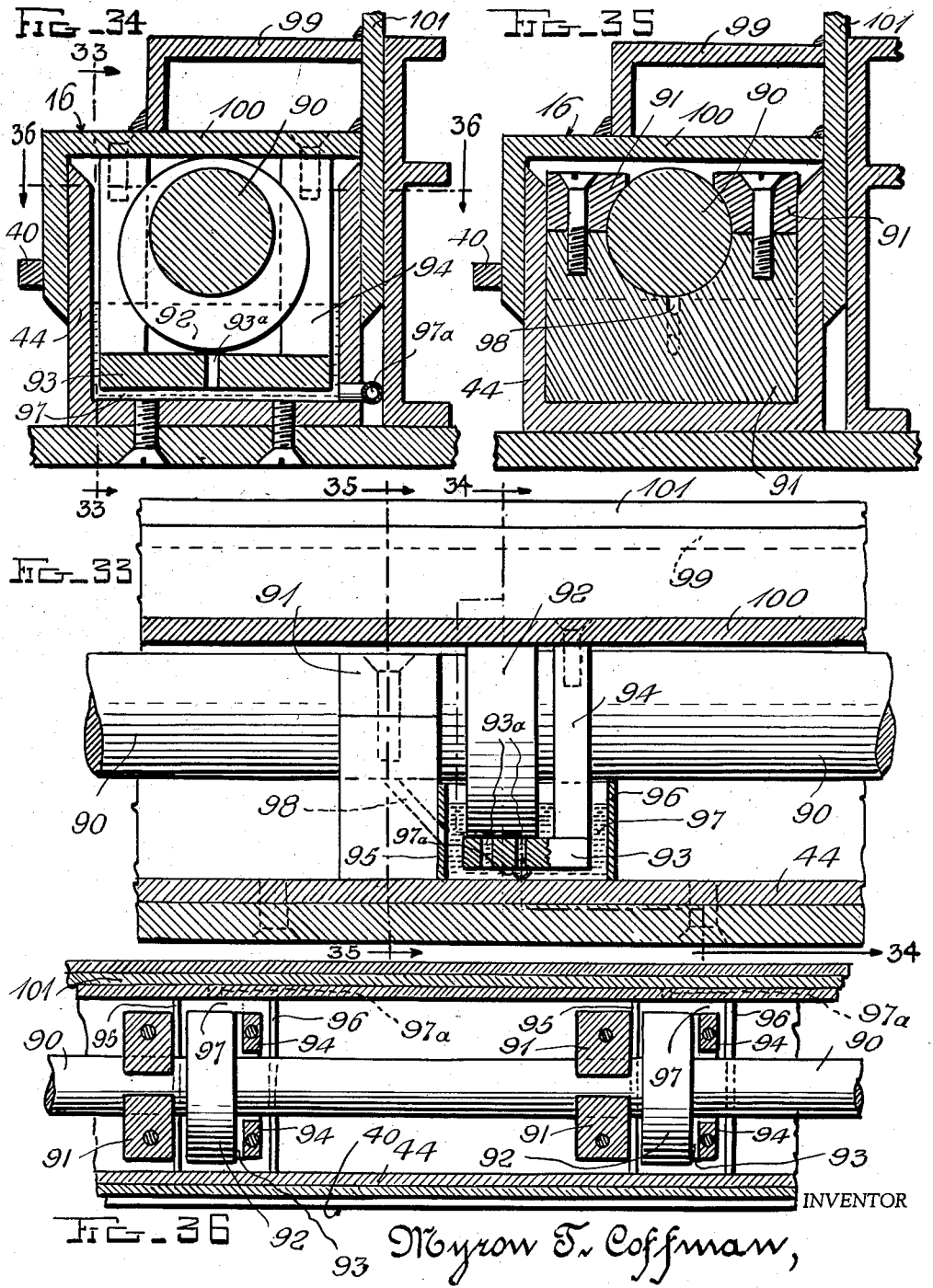
INVENTOR
Myron T. Coffman,
BY
John B. Brady
ATTORNEY

United States Patent Office 2,925,899
Patented Feb. 23, 1960

2,925,899

APPARATUS FOR LOADING COAL

Myron T. Coffman, Ellamore, W. Va.

Application September 17, 1957, Serial No. 684,550

14 Claims. (Cl. 198—7)

My invention relates broadly to the loading of coal, and more particularly to a method and apparatus for loading coal under conditions of extremely low clearance beneath a fractured cut of coal during coal mining operations.

This application is a continuation-in-part of my application Serial Number 449,753, filed August 13, 1954, for Loader-Bar, Control Tube and Coal Loading Machine.

One of the objects of my invention is to provide a mechanism for the side loading of an aggregate onto a removal conveyor by movement of the aggregate over the side and end of the conveyor by apparatus which so agitates and disturbs the aggregate that the loading may be done continuously with the least possible expenditure of work or power.

Another object of my invention is to provide a method of side loading of a coal conveyor which simultaneously provides a substantially clear plane traction surface in the mine over which the conveyor is advanced during the loading process.

Another object of my invention is to provide a hydraulically operated system for controlling a multiplicity of functions in a coal loading machine which operates upon aggregate beneath a fractured cut of coal in timed sequence commensurate with the work being done in moving the aggregate.

Another object of my invention is to provide a construction of coal loading machine requiring extremely low head room of the order of six inches beneath a fractured cut of coal and which includes hydraulically controlled means for operating in timed relation a toe-bar, and an enabling bar, in a position longitudinally of a conveyor and in association with means for advancing the loading machine beneath the fractured cut of coal.

Still another object of my invention resides in the construction of hydraulic driving means for the enabling bar of a coal loading machine including means for positively restoring the enabling bar to start position subsequent to each projection of the enabling bar under hydraulic control.

Still another object of my invention is to provide an arrangement of hydraulic means for imparting reciprocative movement to a toe-bar in a coal loading machine in timed relation to the operation of other functions in the machine.

A further object of my invention is to provide an arrangement of mechanical means for driving a toe-bar and an enabling bar shaped to surge the coal in a composite lateral and vertical direction in timed sequence to the operation of a conveyor in a coal loading machine for insuring the continuous removal of coal by so imparting forward angular surges to the aggregate that it will cascade and gravitate to the conveyor.

Other and further objects of my invention reside in the compact assembly of operating parts and driving means therefor, in a coal loading machine as set forth more fully in the specification hereinafter following by reference to the accompanying drawings in which:

Figure 1 is a top plan view of the coal loader of my invention showing the arrangement of the hydraulic means for driving the toe-bar, and the enabling bar, and the drive for the conveyor;

Fig. 2 is a view similar to the view illustrated in Fig. 1 but showing the cover of the enabling bar removed to illustrate the arrangement for supplying the hydraulic control fluid to the hydraulic cylinders which operate the enabling bar;

Fig. 3 is a bottom plan view of the coal loading machine of my invention;

Fig. 6 is a cross-sectional view on an enlarged scale taken transversely through the enabling bar substantially on line 6—6 of Fig. 14 and showing the enabling bar in spring retracted position;

Fig. 7 is a view similar to the view illustrated in Fig. 6 but showing the hydraulic means for operating the enabling bar, the view showing the enabling bar in retracted position;

Fig. 8 is a transverse sectional view taken substantially on line 8—8 of Fig. 14 showing the enabling bar in its lowermost position preparatory to projection by the hydraulic means;

Fig. 9 is a view similar to the view illustrated in Fig. 8 but illustrating the enabling bar in its uppermost projected position under control of the hydraulic means;

Fig. 10 is a fragmentary perspective view of the enabling bar;

Fig. 11 is a perspective view of the blocks associated with the spring retracting means for the enabling bar;

Fig. 12 is a perspective view of the block in which the hydraulic cylinder for projecting the enabling bar is arranged, the view showing the hydraulic piston substantially flush with the end of the hydraulic cylinder;

Fig. 16 is a longitudinal, vertical, sectional view through the enabling bar taken substantially on line 16—16 of Fig. 13 showing the enabling bar in its retracted position;

Fig. 17 is a view similar to Fig. 16 but illustrating the enabling bar in raised position;

Fig. 18 is an end view of the enabling bar showing particularly the manner of protecting the end of the enabling bar from the entry of dust and dirt, the view showing the enabling bar in its lowermost position;

Fig. 19 is a view similar to the view shown in Fig. 18 but illustrating the enabling bar in raised position;

Fig. 20 is a foreshortened plan view of the toe-bar and the hydraulic operating means therefor;

Fig. 21 is a transverse sectional view through the toe-bar, taken substantially on line 21—21 of Fig. 20;

Fig. 22 is a view similar to the view shown in Fig. 21 but taken on line 22—22 of Fig. 20;

Fig. 23 is a longitudinal sectional view through the toe-bar on line 23—23 of Fig. 21;

Fig. 24 is a vertical, sectional view through the conveyor on line 24—24 of Fig. 1;

Fig. 25 is a schematic layout diagram of the hydraulic connections by which the several functions are coordinated in timed sequence in the operation of the loader;

Fig. 28 is a longitudinal horizontal sectional view through the enabling bar;

Fig. 29 is a transverse sectional view through a modified form of toe-bar;

Fig. 30 shows a fragmentary portion of the toe-bar of Fig. 29, the view being taken in section on line 30—30 of Fig. 29;

Fig. 31 is a perspective view showing the manner of reciprocating the toe-bar of the form shown in Figs. 29 and 30;

Fig. 32 is a plan view of the actuating bar of the toe-bar of Figs. 29–31;

Figure 4:
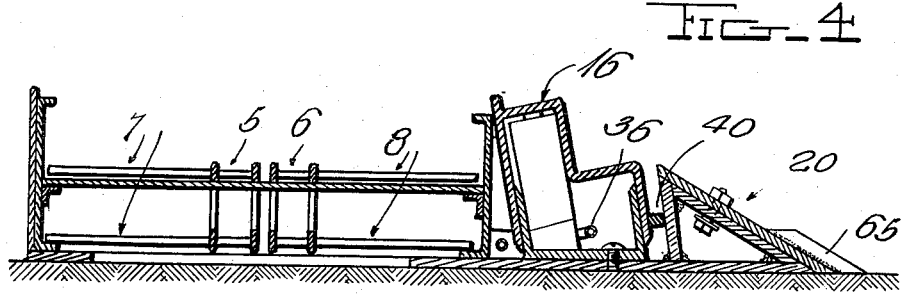
Fig. 4 is a transverse sectional view taken on line 4—4 of Fig. 1 and showing the enabling bar in its lowermost position shaped to impart surges to the coal in both an upward and lateral direction.

Fig. 33 is a fragmentary longitudinal sectional view through a modified construction of enabling bar illustrating a modified form of driving means for mechanically raising and lowering the enabling bar through an eccentric cam structure, the view being taken substantially on line 33—33 of Fig. 34 and showing certain of the parts in side elevation with a portion of the bracket broken away and illustrated in section to show the lubricating means;

Fig. 34 is a vertical sectional view on line 34—34 of Fig. 33;

Fig. 35 is a vertical sectional view on line 35—35 of Fig. 33; and

Fig. 36 is a horizontal sectional view taken substantially on line 36—36 of Fig. 34 and illustrating the enabling bar in plan view with the cam mechanism of Figs. 33–35 located therebeneath for raising and lowering the enabling bar in cyclic progression.

My invention is directed to a coal loading machine which is hydraulically and power driven for coordinating the functions of operation of a toe-bar, an enabling bar, a conveyor, and means for advancing the loading machine with respect to a fractured cut of coal at a speed commensurate with the quantity of the aggregate to be removed in a given time period. The hydraulic operation secured by the method of my invention is carried out by operation of a central prime mover which operates an oil pump for circulating oil under pressure to a valve system, which cyclically controls the reciprocative operation of the toe-bar and the successive raising and lowering of the enabling bar beneath a fractured cut of coal. The loading machine of my invention also employs a conveyor which operates in load capacity relation to the hydraulic operation of the toe-bar and enabling bar and the forward movement of the machine. The advancement of the loading machine beneath a fractured cut of coal is controlled at a rate to accommodate the quantity of the aggregate removed by the conveyor. The loading machine is of small height and comparatively short in length, enabling the loading machine to be moved under control horizontally to bear against the fractured cut of coal to be loaded.

Referring to the drawings in more detail, reference character 1, designates the base support for the loading machine on which there is mounted the loading conveyor to remove the aggregate gravitating onto the conveyor. The conveyor is shown at 2, and is longitudinally driven along base support 1 over sprocket wheels 2 and 4 running within the side rails of channels at opposite sides of the frame of the machine as shown more particularly in Fig. 24, which engage with sprocket chains 5 and 6 forming part of the endless conveyor 2. The flights for the conveyor 2 are shown at 7 and 8, projecting from opposite sides of the sprocket chains 5 and 6 respectively, and serve to move the aggregate along a low, horizontal path as indicated in Fig. 24, and then up its length to a discharge position represented at 9 in Fig. 24. The conveyor is driven by a power take off from any conventional electrically driven gear train through a clutch included within the block 10. The electrically driven gear train operates the conveyor 2 through the sprocket chain 11 engaging the sprocket wheel 12 on the conveyor drive shaft 14.

The block 10 also includes a hydraulic drive system which operates the valve system 15 shown more clearly in Fig. 25 for cyclically controlling the enabling bar represented at 16 in Figs. 1, 4, 5, 6, 7, 8, 9, 10, 13, 16 and 17, from the position at the side of and below a fractured cut of coal to a position in which a lift is imparted to the fractured coal for breaking up the aggregate and causing the aggregate to surge upward and gravitate upon the conveyor 2. The hydraulic drive is controlled by valve 15 shown more clearly in Fig. 25, for imparting movement to the reciprocating device 18 through the arrangement of cylinders 19 for effecting reciprocative operation of the toe-bar 20.

Figure 5:
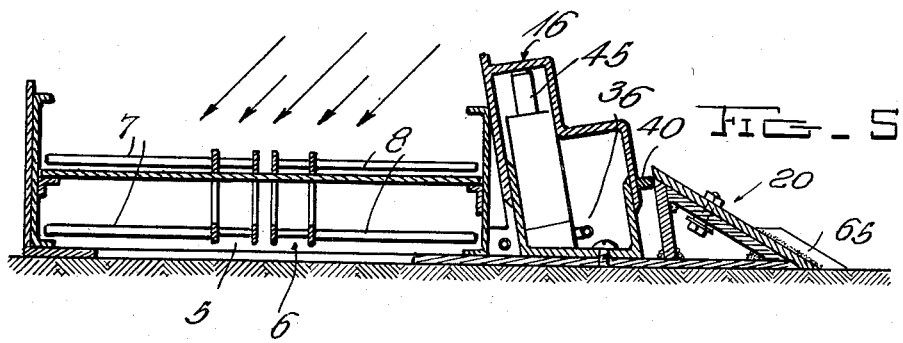
Fig. 5 is a view similar to the view shown in Fig. 4 but illustrating the enabling bar raised to its uppermost position.

The hydraulic system includes the reservoir for oil at 32, the intake filter 33 and intake pipe 34 leading to the hydraulic pump 22 which connects through the relief valve 35 through pipeline 36 to the three hydraulic cylinders 37, 38 and 39 which are supported as represented more clearly in Figs. 7–9, that is, the hydraulic cylinders are in the form of blocks, shown more clearly in Fig. 12, supported in the inverted channel 44 on axes inclined vertically toward the adjacent conveyor 2 as shown more clearly in Figs. 4 and 5. The inverted channel 44 serves as a closure for the base of the enabling bar indicated at 16. The oil circulates through hydraulic cylinders 37, 38 and 39 and returns to the valve 15. Operating valve 15 is activated to the desired CPM (cycles per minute) from a cam driven by a small electric motor. The CPM can be varied by changing the speed of the motor.

As shown in Figs. 6–9 the enabling bar is constructed and shaped in a step-like section to provide a forward as well as an upward surging lift to the aggregate. The enabling bar 16 carries a longitudinally extending ledge 40 along its remote exterior side and both of the depending sides of the enabling bar terminate in knife-like longitudinally extending edges 41 and 42 insuring the cutting away of dust and dirt adjacent the base of channel 44 as the enabling bar returns during each cyclic operation to its lowermost position. The hydraulic cylinders which have been represented in Figs. 7 and 9, as 37, each include floating hydraulic pistons which I have represented at 45. In Fig. 7, the hydraulic piston 45 is shown retracted and the enabling bar 16 is in its lowermost position. In Fig. 9 piston 45 has been shown in its projected position and enabling bar 16 is elevated to its maximum elevated position beneath the aggregate.

To insure the restoration of the enabling bar to the lowermost position, I provide sets of spring recoil assemblies shown in Fig. 24 at 47, 48 and 49, adjacent the hydraulic cylinders 37, 38 and 39 respectively. Each of these spring recoil assemblies has been represented in Figs. 6 and 8 at 47, as consisting of a block member 50 which is attached to the inverted channel 44 and into which the screw-threaded bolt member 51 is secured. The bolt member 51 extends in a vertical direction on an axis coincident with the axis of the adjacent hydraulic cylinder 37. The spring recoil assembly 47 has the upper block portion thereof indicated at 52 attached to the enabling bar 16 by screw members 53 so that block 52 moves with the enabling bar 16. The block 52 is counterbored at 54, to receive the recoil spring 55 and the headed end 56 of the belt 51 operating against the plate 57 which insures operation of the enabling bar 16 in both its elevated and lowered position.

The structure of the toe-bar 20 is shown more clearly in Figs. 20–23 from which it will be seen that the toe-bar 20 is longitudinally guided by means of the structural member 58 of triangular section secured to the base 1 and having an inclined face extending in a plane forming a support for the longitudinal movement of the toe-bar 20 within the limits of the slots 60 in block 61 carried by the undersurface of toe-bar 20 which is longitudinally movable under control of reciprocating device 18 and guided by bolt members 62 which extend through the toe-bar 20 and, slots 60 in block 61 and are secured in the structure 58. The toe-bar 20 carries lug cutter teeth 63 adapted to disturb the coal and sufficiently loosen the aggregate to enable the coal or the aggregate to be surged up and gravitate on to the conveyor 2 for simultaneous removal.

The bottom plate constituting the base support 1 is slotted and cut out as represented at 64 in Fig. 3 providing openings for the escape of any fires.

Figure 26:
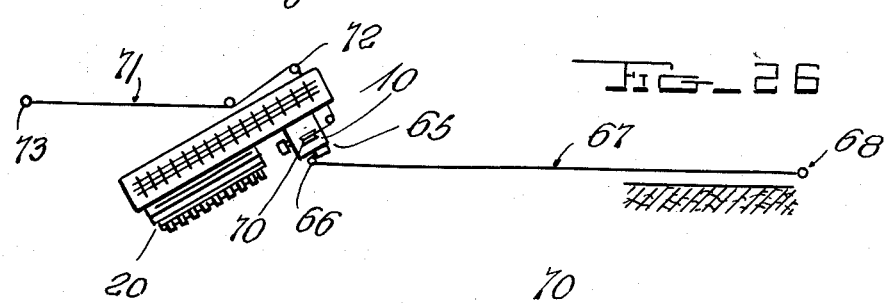
Fig. 26 is a schematic plan view illustrating the manner in which the loading machine is initially brought to bear against a fractured cut of coal in a coal mining operation.
Figure 27:
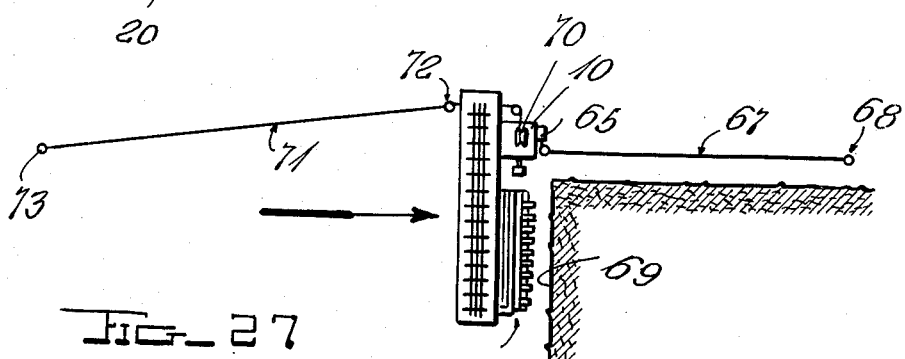
Fig. 27 is a view showing the manner of advancing the loader so that the conveyor is continuously moved beneath the fractured cut of coal during the loading operation.
Figure 13:
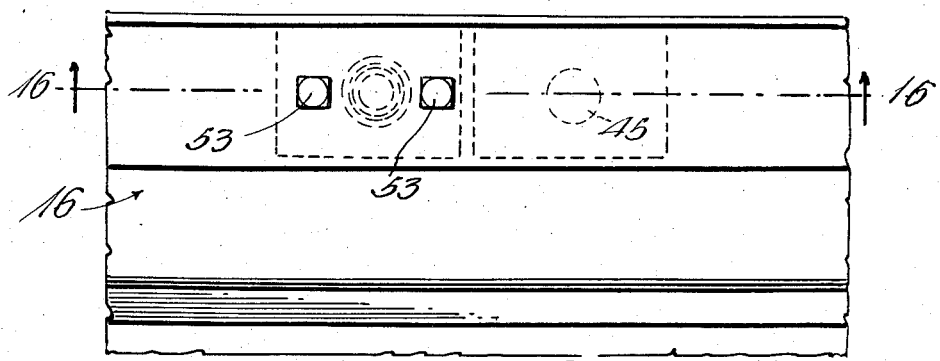
Fig. 13 is a fragmentary top plan view of the enabling bar showing therebeneath the hydraulic operating cylinder and the spring retracting means.
Figure 14:
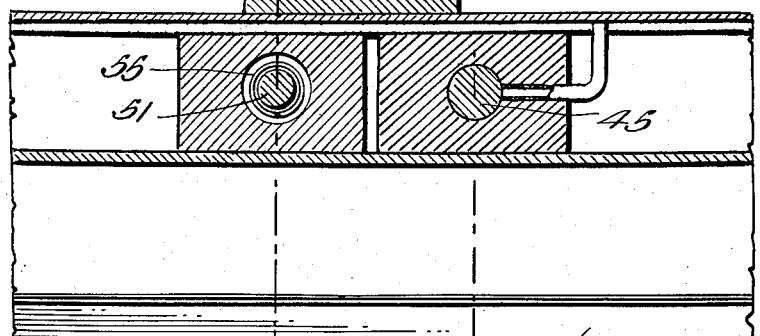
Fig. 14 is a fragmentary longitudinal sectional view through the enabling bar substantially on line 14—14 of Fig. 6 and illustrating the hydraulic cylinder and the adjacent spring retracting means.
Figure 15:
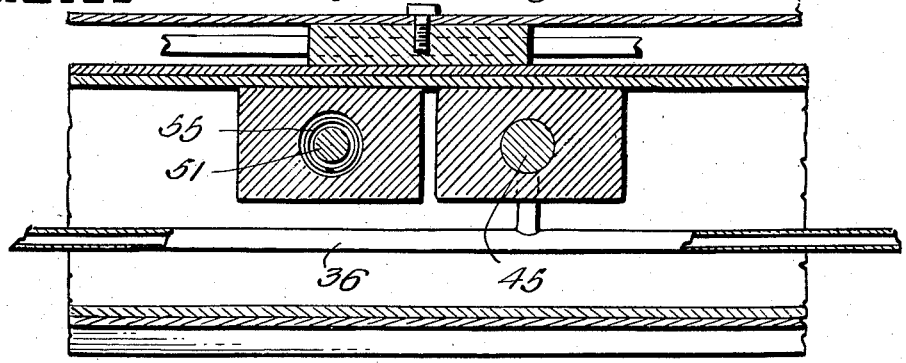
Fig. 15 is a view similar to the view shown in Fig. 14 but taken on line 15—15 of Fig. 6 and showing the hydraulic connection to the hydraulic cylinder.

The movement of the coal loading machine under the fractured cut of coal is effected through wire ropes which are wound up or are let off of revolving drums under tension operated through the aforementioned electrically driven gear train driven by the aforementioned electric motor occupying the location 10 on the machines as represented in Figs. 26 and 27. The electrically driven gear train operates a shaft carrying the drums 65 and 70 which controls through guide pulleys 66 and 72 in the winding and paying out of the wire ropes 67 and 71. The wire rope 67 is securely fastened to a post 68 driven at a suitable location with respect to the coal supply to be mined located generally at 69 so that drum 65 may be driven to take up the wire rope 67 and slide the base 1 beneath the fractured cut of coal while the toe-bar 20 is being reciprocated and while the enabling bar 16 is being periodically raised and lowered and while the conveyor 2 is being driven. The two wire ropes 67 and 71 insure the proper movement of the loading machine into position beneath the fractured cut of coal. The drum indicated at 70 is driven by hydraulic means within block 10 or by electrically driven means. The drum 70 is adapted to wind or unwind the wire rope 71 through guide pulleys 72 where the end of the wire rope 71 is suitably secured to a post 73 located to provide the required leverage forces for swinging the coal loading machine into proper advancing position beneath the fractured cut of coal as the loading operation continues. It will be noted that the several driven components of the machine of my invention are coordinated and timed in operation for insuring maximum speed in movement of the coal as it is broken into aggregate.

In the modified form of my invention illustrated in Figs. 29–32, the structural member 58 is arranged to slidably reciprocate on base support 1 and on the top of wall 82 under the control of toe-bar 20, which is reciprocated by the reciprocating device 18 or other form of mechanical actuator. A guide rod 75 extends through a plurality of blocks shown at 78—79 and 81 which are anchored to the structural member 58 through suitable screws 58a so that blocks 78—79 and 81 move with the structural member 58 guided by guide rod 75. The guide rod 75 extends through triangularly shaped guide blocks 76, 77, 80, etc., which are welded in position to the base 1. It will be noted that the stationary blocks 76, 77 and 80 are alternately positioned with respect to the blocks 78, 79, 81, etc., thereby providing a sturdy construction for the reciprocating system which is subject to severe strains as toe-bar 20 is reciprocated.

Referring to Figs. 33–36, I have shown a modified form of drive for the enabling bar whereby the enabling bar is cyclically raised and lowered by mechanical means which operates in timed relation to the operation of the hydraulic reciprocating means for the toe-bar 20. In this form of my invention there is a rotary shaft which drives the enabling bar and which I have indicated at 90 and which may be a continuation of drive shaft 83 shown in Fig 25. Shaft 90 may be driven by a motor or the hydraulic drive within block 10. Shaft 90 extends substantially the length of the enabling bar 16 and is enclosed by the enabling bar and by the inverted channel 44. Suitable journals are provided for shaft 90 in spaced positions along the length of the inverted channel 44 as represented at 91. The shaft 90 contains a plurality of eccentric cams 92 along the length thereof which operate between the interior face of the enabling bar 16 and the interior faces of associated bracket members, represented at 93, and secured to the inside of enabling bar 16 through the end of the bracket member represented at 94. The eccentric cams, represented at 92, in revolving between the interior faces of the bracket members 93 and the interior face of enabling bar 16, operate to raise and lower enabling bar 16 with respect to the inverted channel 44 and base structure 1. Bracket members 93 and the connecting standard 94 serve as a bridle to retract the bar under control of eccentric cam 92 cyclically after the bar has been elevated or projected by movement of the eccentric cam 92. To insure adequate lubrication of these moving parts I provide a reservoir for lubrication consisting of transverse plates 95 and 96 forming a reservoir for oil in the space represented at 97 supplied from oil line 97a. This reservoir for oil 97 is connected through the channel 98 with the bearing for shaft 90 in journal 91. The bracket members 93 are provided with splash holes 93a through which oil is forced as the bracket members 93 move up and down.

There are a sufficient number of cams 92 and associated bridles constituted by bracket members 93 and standard 94 spaced along the length of shaft 90 to insure reliable and precision operation of the drive mechanism for the enabling bar 16 as indicated schematically in Fig. 31. A positive mechanical drive is thus provided for the enabling bar operating in timed relation to the reciprocation of the toe-bar. The toe-bar 20 may be moved back and forth by a connecting rod extending from toe-bar 20 to a power take off from the drive in block 10.

The enabling bar 16 in this form of my invention is a fabricated structure constituted by the downwardly depending angular members 99 and 100 welded to the vertically extending plate 101. The inverted angle 99 is shorter in transverse width than the inverted angle 100 and thus provides the step which engages the overhanging fractured cut of coal. In other words, the form of my invention illustrated in Figs. 33–36 employs an enabling bar of a built-up structure as distinguished from the pressed structure shown in Figs. 6–10, for example.

The reciprocating face or faces on the enabling bar may be actuated by hydraulic or mechanical means. The example of reciprocation of the lifting faces by mechanical means include the use of rotating or rocking off-balance pulleys or cams.

I have illustrated the toe-bar and the enabling bar located at one side of the conveyor to facilitate loading as the base of the loader is skidded into position beneath the fractured cut of coal to effect side-load. It should be understood however that a toe-bar and enabling bar may be located on both sides of the conveyer so that the machine will load when skidded in either direction. The loader of my invention allows an aggregate to load over the side from either direction.

My invention includes the method of loading coal consisting in accumulating the coal aggregate over the face of the conveyor in a state of unstable equilibrium where the aggregate rests upon the face of the conveyor, the longitudinal edges of the frame and the enabling bar. By moving the aggregate up and down under the action of the enabling bar and by undermining the stack of accumulated aggregate by movement of the toe-bar the aggregate is toppled onto the conveyor into a state of stable equilibrium for longitudinal movement on the conveyor and discharged from one end thereof.

It will be seen, therefore, that the invention may be carried out by the modification of certain details without departing from its spirit or scope.

What I claim as new and desire to secure by Letters Patent of the United States is as follows:

1. A coal loading machine comprising a frame structure, a coal loading conveyor extending longitudinally of said frame structure, a hydraulic pressure system mounted on said frame structure, a longitudinally extending toe-bar arranged adjacent one side of said frame structure and supported thereby and coextensive with a portion of one side of said conveyor, a longitudinally extending enabling bar disposed intermediate said conveyor and said toe-bar, said enabling bar being mounted for up and down movement in a substantially vertical plane lineally of said frame structure and means operated by said hydraulic pressure system for controlling and activating the longitudinal movement of said toe-bar and said enabling bar in timed relation to each other.

2. A coal loading machine comprising a frame structure having a slidable base, a hydraulic pressure system mounted on said frame structure, a toe-bar, an enabling bar and a conveyor all mounted in spaced relation on said frame structure, hydraulic means operated by said hydraulic pressure system for operating said toe-bar, said toe-bar and said enabling bar being coextensive with a portion of one side of said conveyor and separate hydraulic means for operating said enabling bar in cyclically timed relation to the movement of said toe-bar.

3. A coal loading machine as set forth in claim 2, in which said hydraulic drive mechanism operates a fluid pump which supplies the hydraulic pressure system for operating said separate hydraulic means for operating said conveyor, said toe-bar and said enabling bar.

4. A coal loading machine as set forth in claim 2, in which said enabling bar includes means for raising said bar in a substantially vertical direction under control of one of the hydraulic means operated by said hydraulic pressure system and coil spring means for effecting the return of the enabling bar to the restored initial position thereof after each elevation of the enabling bar under control of the said hydraulic means.

5. A coal loading machine as set forth in claim 2, in which said toe-bar is moved longitudinally by the hydraulic means associated therewith, said toe-bar being moved periodically in alternate directions lineally of said frame structure.

6. A coal loading machine as set forth in claim 2, in which said enabling bar is constituted by a channel-shaped inverted structural member and wherein the hydraulic means which operate said member are housed within said enabling bar beneath the channel-shaped structure thereof for raising the enabling bar and spring means extending between said base and the inverted channel-shaped structural member for restoring said enabling bar to its lowermost position subsequent to each elevation thereof.

7. A coal loading machine as set forth in claim 2, in which said base has an angularly inclined support extending longitudinally of one edge thereof and wherein said toe-bar is slidably mounted in a downwardly extending inclined position terminating adjacent said slidable base and wherein the hydraulic means operated by said hydraulic drive mechanism for operating said toe-bar is disposed adjacent one end of said angularly inclined support.

8. A coal loading machine as set forth in claim 2, in which said base includes an angularly inclined support extending longitudinally of one edge thereof, guide means on said angularly inclined support and wherein said toe-bar is connected with said guide means and is aligned thereby for movement in a longitudinal direction, and wherein the hydraulic means operated by the hydraulic pressure system for operating said toe-bar is positioned adjacent one end of said angularly inclined support.

9. A coal loading machine as set forth in claim 2, in which said enabling bar is constituted by an inverted channel-shaped member having a step-like transverse section forming coal engaging plane surfaces at different levels and wherein the hydraulic means operated by said hydraulic pressure system for operating said enabling bar is located within one of the transverse sections of the enabling bar.

10. A coal loading machine as set forth in claim 2, in which said base includes a longitudinally extending channel-shaped section having the side flanges thereof projecting upwardly and in which said enabling bar consists of an inverted channel-shaped section having side flanges projecting downwardly in overlapping telescopic relationship to the side flanges of said first mentioned channel-shaped section, and wherein the hydraulic means for operating said enabling bar is located intermediate the said channel-shaped sections for raising and lowering said last mentioned inverted channel-shaped section with respect to said first mentioned channel-shaped section.

11. A coal loading machine comprising a frame structure, a coal loading conveyor extending longitudinally of said frame structure and an enabling bar movable upwardly and downwardly in a substantially vertical plane adjacent one side of said conveyor and extending longitudinally of the conveyor for the side loading thereof, a toe-bar associated with said enabling bar, means for reciprocating said toe-bar, and means for raising and lowering said enabling bar for the side-loading thereof.

12. A coal loading machine as set forth in claim 11, in which the mechanical means for raising and lowering said enabling bar consists of a rotatably driven shaft journaled in said frame structure, said shaft carrying eccentric cams thereon and said enabling bar being driven in an upwardly and downwardly direction by the displacement of said cams.

13. A coal loading machine as set forth in claim 11, in which said enabling bar is an inverted channel and wherein said mechanical means for raising and lowering said enabling bar is constituted by a longitudinally extending shaft having eccentric cams thereon operative beneath said inverted channel, whereby the displacement of said cams controls the movement of said inverted channel upwardly and downwardly.

14. A coal loading machine as set forth in claim 11, in which said frame structure includes an upwardly directed channel member and wherein said enabling bar is constituted by a downwardly directed member having sides which overlap with the upwardly extending sides of said aforementioned channel member, and wherein said mechanical means for raising and lowering said enabling bar consist of a longitudinally disposed shaft extending between said members, and eccentric cams carried by said shaft and displaceable against said downwardly directed member for raising and lowering said downwardly directed member.

References Cited in the file of this patent

UNITED STATES PATENTS

| 770,286 | Hamilton | Sept. 20, 1904 |
| 1,536,535 | Smith | May 5, 1925 |
| 1,878,037 | Vodoz | Sept. 20, 1932 |
| 1,903,672 | Hauge | Apr. 11, 1933 |